(12) United States Patent
Barille (10) Patent No.: US 9,684,011 B2
(45) Date of Patent: Jun. 20, 2017

(54) METHOD FOR DETECTING TURBULENCE CONDITIONS, USING THE INTERACTION OF A LASER BEAM WITH A THIN PHOTOCHROMIC FILM, AND DEVICE FOR IMPLEMENTING SAID METHOD

(71) Applicants: CENTRE NATIONAL DE LA RECHERCHE SCIENTIFIQUE, Paris (FR); UNIVERSITE D'ANGERS, Angers (FR); WROCLAW UNIVERSITY OF TECHNOLOGY, Wroclaw (PL)

(72) Inventor: Regis Barille, Angers (FR)

(73) Assignees: CENTRE NATIONAL DE LA RECHERCHE SCIENTIFIQUE, Paris (FR); UNIVERSITE D'ANGERS, Angers (FR); WROCLAW UNIVERSITY OF TECHNOLOGY, Wroclaw (PL)

(*) Notice: Subject to any disclaimer, the term of this patent is extended or adjusted under 35 U.S.C. 154(b) by 0 days.

(21) Appl. No.: 14/438,116

(22) PCT Filed: Oct. 23, 2013

(86) PCT No.: PCT/EP2013/072186
§ 371 (c)(1),
(2) Date: Apr. 23, 2015

(87) PCT Pub. No.: WO2014/064159
PCT Pub. Date: May 1, 2014

(65) Prior Publication Data
US 2015/0293140 A1     Oct. 15, 2015

(30) Foreign Application Priority Data
Oct. 24, 2012 (FR) ..................................... 12 60113

(51) Int. Cl.
*G06K 9/00* (2006.01)
*G01P 5/00* (2006.01)
(Continued)

(52) U.S. Cl.
CPC .............. *G01P 5/001* (2013.01); *G01P 5/26* (2013.01); *G06T 3/0056* (2013.01)

(58) Field of Classification Search
CPC ........... G01P 5/001; G01P 5/26; G06T 3/0056
(Continued)

(56) References Cited

U.S. PATENT DOCUMENTS 7,268,937 B1    9/2007 Andersen
2004/0142386 A1*  7/2004 Rigler ..................... C12Q 1/04
                                                435/7.2

OTHER PUBLICATIONS

Aleksandr V. Sergeyev et al., "Monitoring the statistics of turbulence: Fried parameter estimation from the wavefront sensor measurements," Applied Optics, vol. 50, No. 20, Jul. 10, 2011, pp. 3519-3528.
(Continued)

*Primary Examiner* — Andrew Moyer
(74) *Attorney, Agent, or Firm* — Baker & Hostetler LLP (57) ABSTRACT

A method for assessing turbulence parameters of a medium comprises the following steps: the illumination, by a laser beam being propagated in said medium, of a film of photochromic organic material that can comprise molecules of azobenzene, or of spyropyrane, or of stilbene, or of coumarin, or of fulgide, said illumination creating a surface grating in said film comprising scratches, the deformations of which are a function of the turbulence parameters; a step of acquisition of images comprising individual areas of structures linked to said scratches, more or less reduced and representative of the turbulence parameters of said medium; a step of processing of said images that makes it possible to assess the turbulence parameters of said medium. A device is also provided.

9 Claims, 9 Drawing Sheets

(51) Int. Cl.
*G01P 5/26* (2006.01)
*G06T 3/00* (2006.01)

(58) Field of Classification Search
USPC .............. 382/100, 108, 141, 143, 152, 276
See application file for complete search history.

(56) References Cited

OTHER PUBLICATIONS

H. J. Pfeifer et al., "Effects of atmospheric turbulence on the visibility and spacing of interference fringes," Journal of Optical Society of America, vol. 70, No. 2, Feb. 1980, pp. 163-167.

Saifollah Rasouli et al., "Application of moire technique to the measurement of the atmospheric turbulence parameters related to the angle of arrival fluctuations," Optics Letters, vol. 31, No. 22, Nov. 15, 2006, pp. 3276-3278.

A. Consortini, et al., "Measuring Inner Scale of Atmospheric Turbulence by Angle of Arrival and Scintillation", Optics Communications, Feb. 1, 2003, pp. 19-23, vol. 216, No. 1-3, Elsevier Science B.V., Amsterdam, NL, XP004404778.

Yu Venediktov, et al., "Liquid Crystals in Dynamic Holography (Review)", Optics and Spectroscopy, Jul. 28, 2011, pp. 113-133, vol. 111, No. 1, Nauka/Interperiodica, MO, XP019931375.

D.C. Fromm, et al., "The Cataphoretic He—Cd Laser Properties, Construction, and Application in Holography", Optics and Laser Technology, Apr. 1, 1976, pp. 68-70, vol. 8, No. 2, Elsevier Science Publishers BV, Amsterdam, NL, XP024449093.

\* cited by examiner

METHOD FOR DETECTING TURBULENCE CONDITIONS, USING THE INTERACTION OF A LASER BEAM WITH A THIN PHOTOCHROMIC FILM, AND DEVICE FOR IMPLEMENTING SAID METHOD

CROSS-REFERENCE TO RELATED APPLICATIONS

This application is a National Stage of International patent application PCT/EP2013/072186, filed on Oct. 23, 2013, which claims priority to foreign French patent application No. FR 1260113, filed on Oct. 24, 2012, the disclosures of which are incorporated by reference in their entirety.

FIELD OF THE INVENTION

The field of the invention is that of the methods that make it possible to detect the turbulences of a medium, exploiting the turbulences generated on the propagation of a laser beam and that of the compact devices implementing such a method.

BACKGROUND

This type of method can be used equally to measure turbulence rates (more or less strong in a given environment) and to measure the effects of turbulence on the propagation of a laser beam.

In effect, the analysis of turbulence has many potential applications, via compact and discrete means, notably in the field of the environment, of detection of temperature rises, of air movements in a town for example.

It can also be highly advantageous to measure the modifications brought about on the propagation of a laser beam by ambient turbulences. The propagation of laser beams through a turbulence medium is notably of great importance in applications such as optical communication in free space (sea, battlefield, etc.), the detection of targets, imaging and long-distance detection. In many of these applications, lasers with their electromagnetic field coherence properties are used.

The coherent fields which are propagated in random mediums such as atmospheric turbulence are subject to random spatial and temporal distortions and flickerings of the optical intensities which can lead to a considerable degradation in the performance of the system. These flickerings due to rapid and continuous changes of temperatures and of pressure close to the surface of the ground are more severe and more pronounced there and induce distortions of the phase structure of the wave field by the turbulence causing the wave to interfere with itself.

These changes in the data and parameters of the beam introduce fundamental limitations into the development of the optical communication systems in free space. One of the significant effects of atmospheric turbulence is the fluctuation of the direction of the propagation of the wave front referred to as the fluctuation of the angle of arrival or the tilt of the wave front. This angle is measured by different methods.

One of the methods consists in simultaneously performing differential measurements of the angles of arrival and of the fluctuations of intensity of the laser beam from a reference by using a CCD camera since the measurements of spatial fluctuations are highly sensitive to the wavelength of the path traveled by the laser beam (A. Consortini et al., Optics Communications, 216, 19-23, (2003)). This fluctuation depends cubically on the length of the optical path traveled.

Other methods consist in using a structuring of the laser beam either with interference fringes and by analyzing their visibility in the case of a type of Doppler laser anemometry (H. J. Pjeider et al., J. Opt. Soc. Am., Vol. 70(2), 167-170, (1980)) or else by using the displacement of the Moiré fringes (S. Rasouli et al., Opt. Lett., 31(22), 3276-3278, (2006)) resulting from the superposition, with the same step, of an image of reference fringes and an image of fringes resulting from the turbulence. The Moiré structures give the fluctuations of the angle of arrival.

In both cases, the methods are difficult to implement since the interferences have to be created for the Doppler anemometry or else two amplitude gratings have to be installed and their initial stability has to be ensured for the Moiré technique. The tilt of the wave front is, for its part, analyzed by using polynomial techniques based on an analysis method of shark-Hartmann type (A. V. Sergryev et al., Appl. Opt., 50(20), 3519-3528, (2011)) and requires a system for analyzing the wave front of the laser that is complex and costly. The fluctuations of the angle of arrival or the tilt of the wave front are used to measure the characteristic parameters of the atmospheric turbulence. The structure parameter of the refraction index or $C_n^2$ is a measurement of the force of the optical turbulence along the laser beam propagation path. In the laser propagation in free space, the measurement of the fluctuations of the angle of arrival is a basic step in the study of atmospheric turbulence.

SUMMARY OF THE INVENTION

In this context, the subject of the present application is a method that is easy to implement, that opens the way to devices for assessing the turbulence of a medium, that can notably be linked to ambient air heating phenomena that are easy to implement and that can be deployed in large numbers.

More specifically, the subject of the present invention is a method for assessing turbulence parameters of a medium, characterized in that it comprises the following steps:

the illumination, by a laser beam being propagated in said medium, of a film of photochromic organic material that can comprise molecules of azobenzene, or of spyropyrane, or of stilbene, or of coumarin, or of fulgide, said illumination creating a surface grating in said film comprising scratches, the deformations of which are a function of the turbulence parameters;

a step of acquisition of images comprising individual areas of structures linked to said scratches, more or less reduced and representative of the turbulence parameters of said medium;

a step of processing of said images making it possible to assess the turbulence parameters of said medium.

According to a variant of the invention, the method comprises a step of acquisition of images of diffraction of the laser beam by the surface grating created, said images exhibiting diffraction spots, the characteristics of which are dependent on the turbulence parameters.

According to a variant of the invention, the step of processing of said images comprises:

an operation of Radon transform of said images so as to generate images derived by image computation in a revolving reference frame generating, from areas of diffraction belonging to said images, a set of peaks belonging to the derived images;

a comparison of said set of peaks with a set of reference peaks of turbulence conditions, so as to estimate the level of turbulence of said medium.

According to a variant of the invention, the method comprises:
- a step of acquisition of images performed by atomic force microscopy AFM;
- a step of processing of said images making it possible to recognize, quantify and analyze the individual areas formed on the surface dependent on the turbulence parameters and making it possible to obtain derived images;
- a step of analysis of said derived images by fractal or multifractal analysis, over all of said individual areas making it possible to define scale invariance properties and determine the turbulence information of said medium.

According to a variant of the invention, the step of processing of said images comprises the following operations:
- the use of a Gaussian filter, averaging each of the acquisition points with neighboring points and generating filtered images;
- the construction of a set of derived images by processing of said filtered images, that can be carried out by the transformation of said filtered images into binary filtered images, then marking of the areas free of scratches, so as to increase the contrast between said individual areas.

According to a variant of the invention, the step of fractal or multifractal analysis comprises the following steps:
- the division of said image according to two dimensions x and y, into segments N/s, defining a partition in boxes, N being a dimension of the image and the computation of two cumulative sums X(i) and Y(i) defining a signal, such that:

$$X(i) = \Sigma_{k=1}^{i} x_k - \langle x \rangle \text{ and } Y(i) = \Sigma_{k=1}^{i} y_k - \langle y \rangle$$

with $\langle x \rangle$ and $\langle y \rangle$ corresponding to the averages of the signal on x and y;
- the estimation in each of the boxes of a surface defined by two polynomial functions $(p_v(i), q_v(i))$ according to the two dimensions x and y, making it possible to approximate said signal and making it possible to define:
  - a trend in each of the boxes and
  - the variations relative to said trend so as to define the parameters $X_s(i) = X(i) - p_v(i)$ and $Y_s(i) = Y(i) - q_v(i)$;
- the computation of a fluctuation function stripped of said trends defined by the equation:

$$F_q(s) = \sqrt[q]{\frac{1}{N} \sum_{i=1}^{N_s} (|X_s(i)||Y_s(i)|)^q}$$

with q being a non-zero integer and in which:

$$\Sigma_{i=1}^{N_S}(|X_S(i)||Y_S(i)|)^q \approx s^{\tau(q)}$$

making it possible to define:
- a power law between the function $F_q(s)$ and the size(s) of the boxes and
- the multifractale scale exponent $\tau(q)$ and $\tau(q) = qh(q) - 1$;
- the determination of a singularity function $\alpha(q) = d\tau(q)/dq$ and of a multifractale spectrum: $f(\alpha) = q(\alpha) \cdot \alpha - s[q(\alpha)]$ exhibiting a maximum value $f(\alpha)_{max}$;

the comparison of the value $f(\alpha)_{max}$ with a calibration table referring to the values $f(\alpha)_{max\_St}$ with refraction indices Cn and making it possible to link the refraction index Cn with a reference turbulence parameter.

Another subject of the invention is a device for assessing turbulence parameters of a medium, characterized in that it comprises:
- a measurement unit comprising:
  - a film of photochromic organic material that can comprise molecules of azobenzene, or of spyropyrane, or of stilbene, or of coumarin, or of fulgide;
  - a laser source emitting a laser beam being propagated in said medium and interacting with said film so as to create a surface grating comprising scratches, the deformations of which are a function of the turbulence parameters;
  - a detector making it possible to acquire images comprising individual areas of structures linked to said scratches, more or less reduced and representative of the turbulence parameters of said medium and generating signals relative to said images;
- a device for receiving and processing said signals delivering assessment information on the turbulence parameters of said medium.

According to a variant of the invention, the device for assessing turbulence parameters of a medium comprises a set of measurement units, said measurement units being linked with said reception and processing device.

Yet another subject of the invention is the use of the device for assessing turbulence parameters of an ambient medium according to the invention, for producing measurements of air movements, for example in an urban environment.

BRIEF DESCRIPTION OF THE DRAWINGS

The invention will be better understood and other advantages will become apparent on reading the following description given as a nonlimiting example and from the attached figures in which:

FIGS. 4a and 4b illustrate the images resulting from the Radon transform of two examples of images illustrated in FIG. 2a;

DETAILED DESCRIPTION

The invention will be described in the context of a film of azobenzene, but can equally well use other types of photochromic organic materials. The effect used in the present invention corresponds to a holographic recording in which the fringes are themselves constructed during the process of molecular self-organization and give a statistical average over the long term of the effect of the turbulent medium on the laser propagation. The organic holographic materials have the advantage over their inorganic equivalents of being structurally polyvalent, easy to produce and inexpensive.

This type of photochromic material, such as an azopolymer material, is capable of self-organizing on the surface under the effect of the light of a laser to produce a structuring in the form of a diffraction grating, making it possible to simultaneously measure a plurality of characteristics of said turbulence.

The molecules of azobenzene have been studied for more than a half century for their particular optical properties and, even these days, new phenomena linked to their photoisomerization are being discovered. Among these phenomena, the deformation of material photo-induced in the photochromic materials containing these molecules is undoubtedly one of the most noteworthy. Successive cycles of isomerization of the molecule can result in a displacement of material, over distances of several hundreds of nanometers. The molecules of the family of azobenzenes are characterized by two benzenic cycles linked by a double bond between two nitrogen atoms. They can exist in two isomer forms: the trans (or E) form and the cis (or Z) form. The transition from the trans form to the cis form is excited by absorption of a photon and the reverse transition from the cis form to the trans form can be either excited optically or activated thermally.

It has moreover been demonstrated that the azo molecules of the material photoisomerize by repeating trans-cis-trans isomerizations induced by the absorption of light, resulting in molecular orientation being done at right angles to the direction of the polarization of the light.

This effect can be observed on a thin film of polymer containing azobenzenes capable of producing a topographical grating on the surface of the film after exposure by a structure of interferences created by two laser beams.

However, the Applicant has started from the principle that this surface structuring can be produced also with a single laser beam by self-organization of the azo molecules where the direction of the wave vector of the grating depends on the polarization of the laser beam.

The surface gratings can then be erased by the use of a laser beam with a circular polarization or by heat treatment.

The Applicant has validated the concept of the present invention by producing turbulence conditions in an ambient medium, and by recording the images of the surface grating created by a laser beam after propagation of said beam in the ambient medium disturbed by the turbulences created, and has done so in order to highlight the correlation between the turbulences and the modifications of structures produced on the surface of the film of photochromic organic material.

Figure 1:
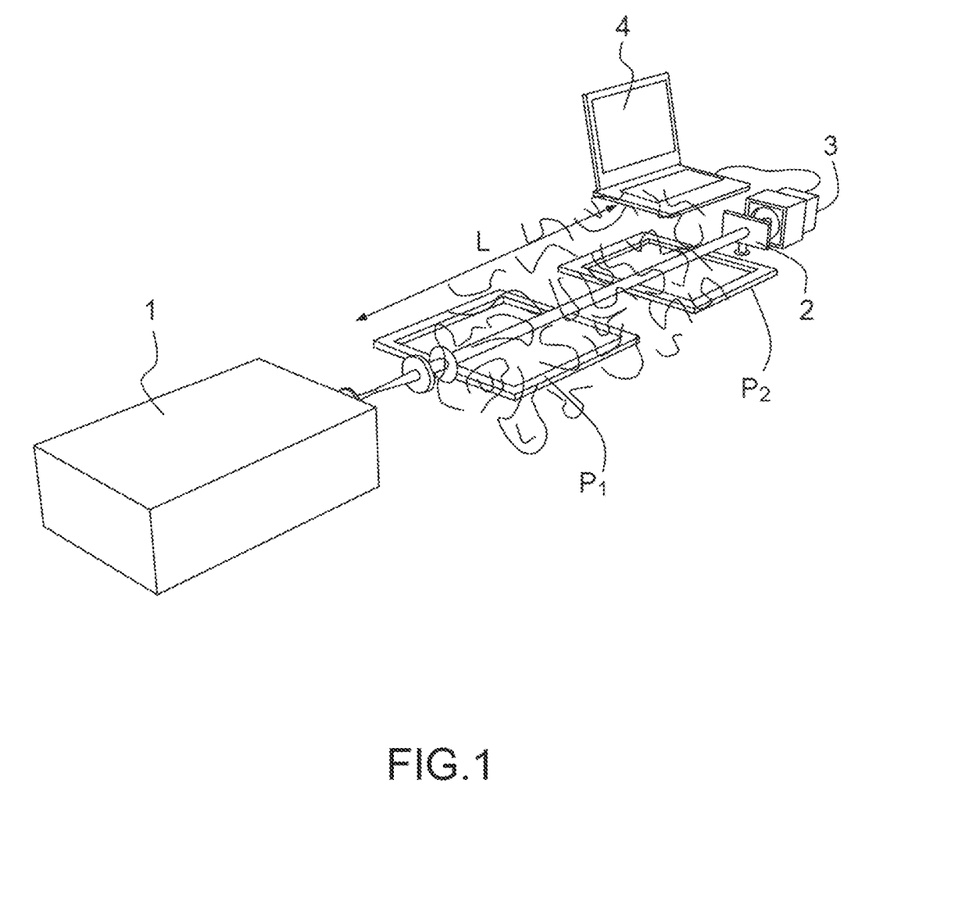
FIG. 1 illustrates an exemplary device making it possible to validate the concept of the present invention.

The parameters of the turbulent medium necessary to the assessment of the present invention were first assessed. The turbulence produced is representative of an atmospheric turbulence in real conditions. The experiment rig illustrated in FIG. 1 consists of a laser beam from a laser 1 (stable, pumped by diode) at $\lambda$=473 nm with a power of 5 mW being propagated through a turbulent medium of length L=1 m produced by at least one electrical heating plate (two plates $P_1$ and $P_2$ are represented in FIG. 1) at the temperature of 98° C. and generating a flow of hot air at the temperature of 42° C.

The air flow generated exhibits velocities v modified by a grating having pitches of different widths, said velocities lying between 12.5 m/s and 7.6 m/s.

The intensities and the angles of arrival of the beam $F_1$ were assessed in two successive steps.

For this, a CCD camera 3 is used, to measure the total intensity of the light distribution detected and the coordinates x and y of the center of the beam, after switching the film of photochromic material 2 to transmission mode. The surface area of the detector is 8.4 mm×6.2 mm. The images can be recorded and processed via a unit 4.

1) The angles of arrival are obtained by measuring the lateral displacements of the beam on the camera by comparison with a reference beam without turbulence. The angles are counted between a diaphragm and a position of the beam on the camera. The distance between the diaphragm and the camera is a non-turbulent area of propagation and is sufficient for a good resolution of the displacement measurement.

The values of the angles of arrival are given by:

$\alpha_x = \delta x/d$ and $\alpha_y = \delta y/d$.

The Applicant measured the angle of arrival for different turbulence conditions.

The limit of approximation of the geometrical optic for $L \ll l_o^2/\lambda$ is assumed, where $l_o$ is the internal scale of the turbulence and $\lambda$ the wavelength of the laser beam.

The effective value of the fluctuations of the angle of arrival is given by:

$$\langle \alpha_x^2 \rangle = \langle \alpha_y^2 \rangle = 3.28 . C_n^2 L l_o^{-\frac{1}{3}}$$

where $C_n$ is the constant of the refractive index of the medium (L. C. Andrews, 'Field guide to Atmospheric Optics', SPIE press book, (2004)).

2) The fluctuations of intensity of the beam are measured over time with a photo diode and are defined by:

$$\sigma_I^2 = \frac{\langle I^2 \rangle - \langle I \rangle^2}{\langle I \rangle^2} = 12.8 C_n^2 L^3 l_o^{-\frac{7}{3}} = 1.23 C_n^2 k^{\frac{7}{6}} L^{\frac{11}{6}}$$

where L is the path of the laser beam. It is therefore possible to compute the internal scale of the turbulence by:

$$l_o = 1.97 \sqrt{\frac{\langle \alpha_x^2 \rangle}{\sigma_I^2}}$$

The samples of the polymer films are made from a synthesis of a new chromophoric monomer derived from azobenzene containing heterocyclic sulfonamide compounds. The monomer of methacrylate type contains aliphatic spacers of different lengths between the methacrylic and chromophoric groups. The monomers concerned are polymerized to obtain homopolymers and copolymerized with 2-methacrylate and 2-ethylhexyl acrylate to obtain copolymers containing several percentages of chromophoric units.

The thin films are prepared by spin deposition from a solution diluted with THF and a concentration of 50 mg/ml. The thickness of the film measured with a dektak 6M profiler is 1 μm.

The maximum absorbance at $\lambda=488$ nm is 1.9, The absorbance at the experiment wavelength $\lambda=476$ nm is 1.6.

The laser beam is first made parallel by an afocal system of two lenses (Kepler). The diameter of the beam is 5.1 mm. A diaphragm makes it possible to choose the central region of the wave front and to generate a quasi-planar wave of diameter 3.1 mm. The diameter of the diaphragm is chosen to select a region of the laser beam as the best compromise between a region of the planar wave front and a signal of intensity that allows for a reasonable signal-to-noise ratio value.

The laser beam passes through the turbulent medium over a distance of 1 m and is sent to the thin film of azopolymer 2 of the present invention with a power between 100 and 300 mW/cm$^2$.

An optical system makes it possible to collect the intensity of the order of diffraction and control in time the progress of the holographic inscription. When the diffraction intensity arrives at saturation, the laser beam is cut and the surface of the thin film on which the process is inscribed is characterized by imaging, a number of imaging types being able to be employed.

Experiments have been conducted for four examples of increasing turbulence conditions T1, T2, T3 and T4, generating different surface topographies, but in which the surface is self-organized under the effect of the laser to create a diffraction grating.

First Analysis Mode by Semi-Fine Analysis:

A camera of CCD type is used to observe the diffraction of the self-organized structure created on the surface and obtained by the beam itself. It makes it possible to follow over time the construction of the structure on the surface. For a beam being propagated without turbulence, the grating forms a regular alignment of scratches on the surface with a grating pitch $\Lambda=2\lambda/\sin\theta$ where $\theta=90°$ for a beam incidence of 90°.

Figure 2A:
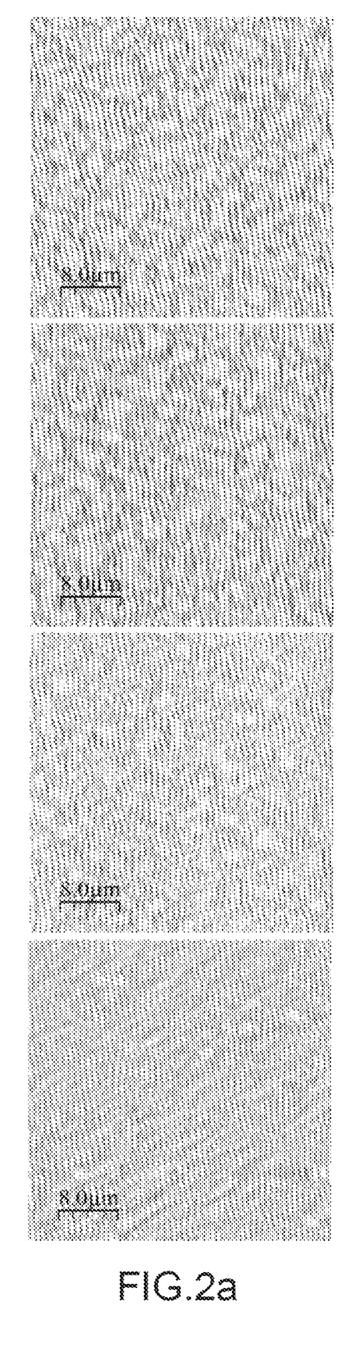
FIGS. 2a and 2b illustrate gratings inscribed in a film of photochromic material and the different corresponding diffraction images taken by a CCD camera.
Figure 2B:
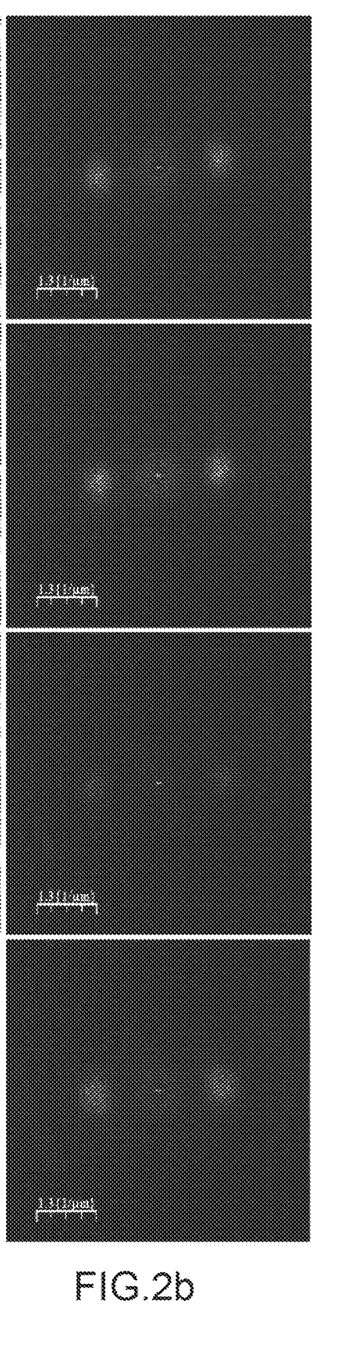

FIGS. 2a and 2b relate respectively to the gratings inscribed in the film of photochromic material and to the diffraction images taken by the CCD camera and comprising spots given by the order of diffraction, for the four turbulence conditions T1, T2, T3 and T4.

The spacing of the spots gives the spatial frequency of the self-organized grating present on the surface of the sample. The diffraction figure follows a power law in time to saturation of the phenomenon and depends on the power of the laser beam. The change of propagation conditions of the laser beam induces additional spatial frequencies disturbing the regularity of the pitch of the beam. These additional frequencies are identified by the appearance of intensities outside of the two spots. The spatial information on the direction of the wave vectors of the additional spatial frequencies is given by their coordinates X and Y relative to the two spots and by the surface area of the intensities. A significant surface area characterizes a significant diffusion of the spatial frequencies and therefore a greater turbulence.

With the modification of the propagation medium, additional frequencies are created at the center and outside of the two spots corresponding to the reference self-organized grating. These spatial frequencies are low implying a variation of the surface area over greater distance and correspond to the creation of large structures. The appearance of frequencies on the profile of the diffraction intensities outside of the two spots implies the creation of sub-gratings at the frequencies greater than the main grating.

FIG. 2a shows notably that the turbulence creates substructures with pitches of the sub-gratings $\Lambda$s of 400±30 nm.

By monitoring the diffraction created, it is possible to follow the trend of the sub-gratings created and of the non-uniform areas which appear.

The variation of polarization induced by the turbulence is measured by the horizontal direction of the two diffraction spots. The laser beam has a linear and horizontal polarization represented by the two diffraction spots on a horizontal plane.

For example, the linear polarization component changes by an angle $\theta=7.1°$ for the example of the turbulence T4.

Figure 3:
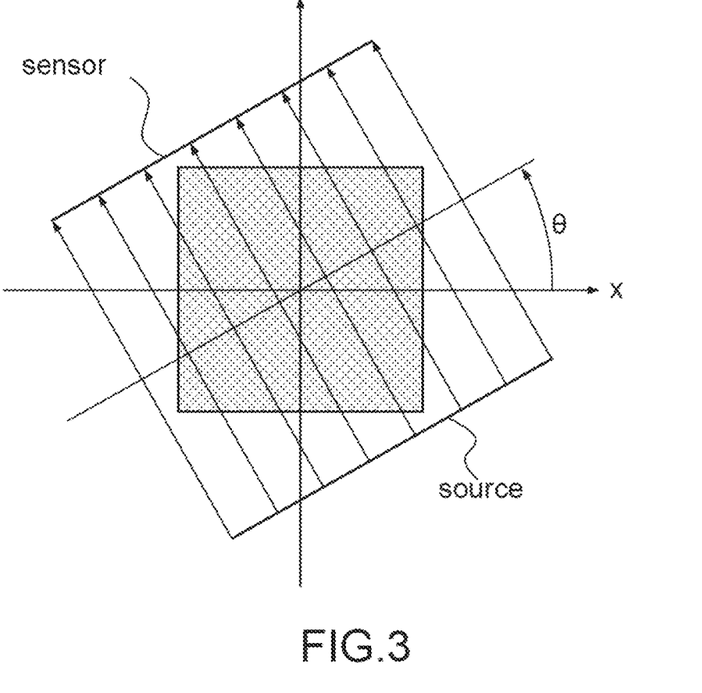
FIG. 3 illustrates the principle of the Radon transform of an image of a diffraction grating inscribed in a film of photochromic material.

Advantageously, the diffraction images can be analyzed by Radon transform, the actual computation of the discrete Radon transform numerically involving interpolations of the image to be processed, in order to estimate it in a revolving reference frame, as illustrated in FIG. 3.

Figure 4A:
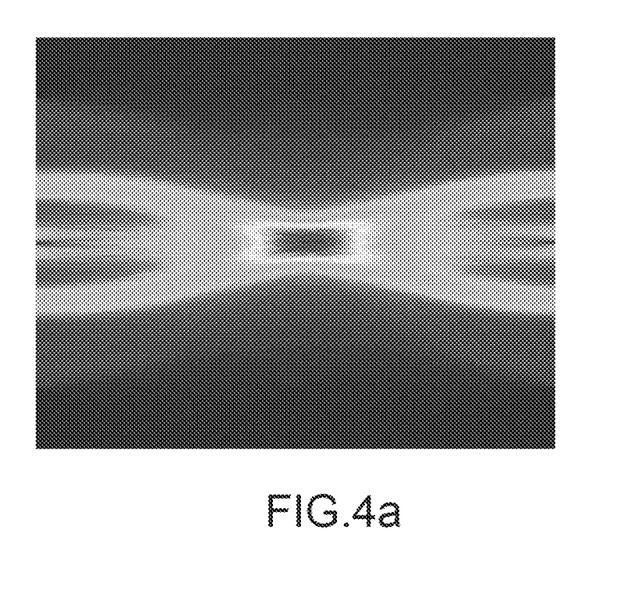
Figure 4B:
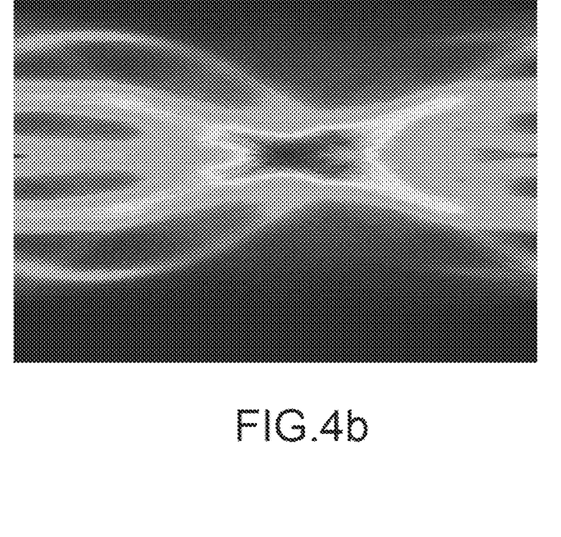

For this, the projection of the image is computed along given angles. The result is the sum of the intensities of the pixels in each direction, that is to say the integral of each of the lines. A new image $R(\rho,\theta)$ is obtained and a cut is made for $t=0°$. The derived images of FIGS. 4a and 4b are for example obtained, corresponding to an average turbulence and to a strong turbulence.

Figure 5A:
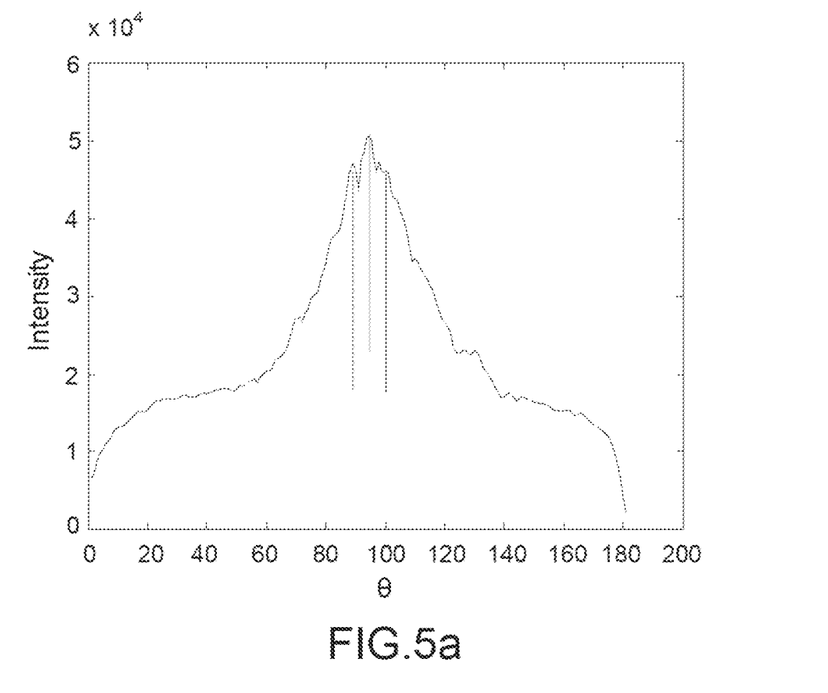
FIGS. 5a and 5b illustrate the intensity peaks obtained from the processing of the images illustrated in FIGS. 4a and 4b and representative of the degree of turbulence of the medium analyzed.
Figure 5B:
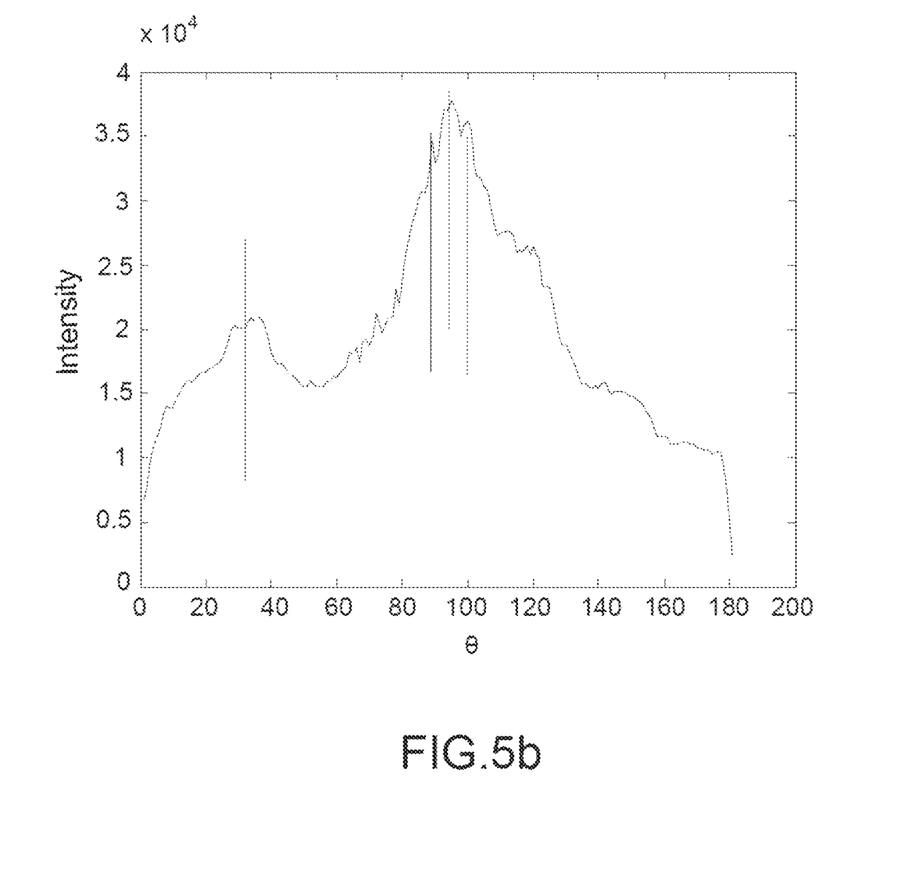

The representations of the intensity as a function of the angle $\theta$ as illustrated in FIGS. 5a and 5b show the presence of a central peak representing the projection of the two spots given by the diffraction of the beam on the grating without turbulence. The peaks outside of the central peak represent the contributions of the additional spatial frequencies provided by the movement of the laser beam disturbed by the turbulence. By comparing the peaks which are formed on either side of the central peak, the degree of turbulence induced during the travel of the laser beam can be qualitatively known instantaneously with the camera.

Figure 6A:
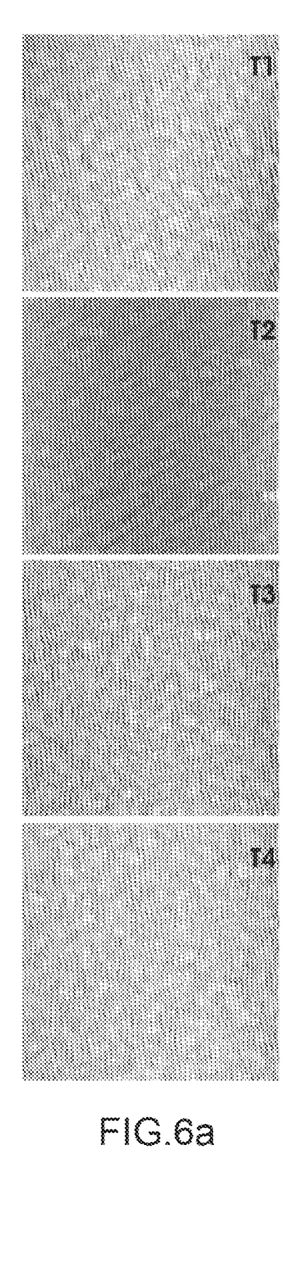
FIGS. 6a, 6b and 6c respectively illustrated images taken by atomic force microscopy AFM of a surface grating inscribed in a film of photochromic material, the same images filtered exhibiting areas defined by contours, then the same images comprising these areas, after marking of the interiors of said areas.

2) Second Fine Analysis Mode by AFM Imaging:

2.1: Image Processing Step:

The grating inscribed by atomic force microscopy is characterized in contact mode. FIG. 6a gives the topography of the surface of the film after inscription by the laser for the four examples of turbulence conditions T1, T2, T3 and T4. The surface is self-organized under the effect of the laser to create a diffraction grating.

For a weak turbulence condition, the surface exhibits a self-organized grating, the pitch of the grating $\Lambda=800\pm30$ nm of which is disturbed by the random fluctuations of the angle of arrival of the beam. The pitch of the grating given by the theory of the diffraction of the second order corresponds to the incident beam angle condition $\Lambda=2\lambda/\sin\theta$.

It will be noted that certain areas of the structure on the surface have a reduced structure. The topographies obtained for different turbulence conditions are considered as random Gaussian surfaces.

The structurings observed are first processed by an algorithm of the present invention to recognize, quantify and analyze the sub-areas on the surface modified by the turbulence.

Fractal and multifractale analysis techniques are then applied to obtain the scale invariance properties over all of the disturbed sub-areas applicable to the measurement of the effect of turbulence on a laser beam.

These techniques make it possible to have an accurate description of the complexity of the disorganized sub-areas.

More specifically, the image is firstly integrated. For this, a Gaussian low-pass filter is used, the aim of which is to attenuate the spatial high frequencies. The filter averages each of the points with its neighbors. This has the effect of eliminating the high frequencies and augmenting the low-frequency signal. In the present case, the filter makes it possible to reduce the contrast of the areas where there is an absence of grating and makes it possible to mark the areas where the grating has disappeared because of the disturbance on the laser which creates the grating by the turbulence.

Figure 6B:
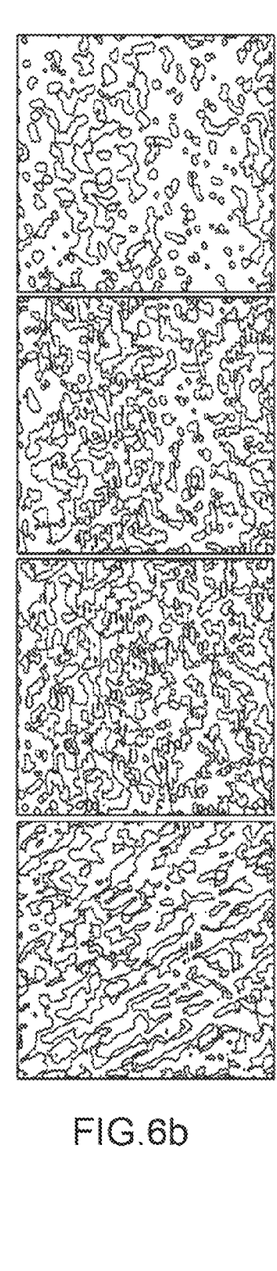

This operation amounts to drawing the contours of these Gaussian surfaces by thresholding the height of the topography with a fixed spacing $\Delta$ between the height of the successive contours to obtain only the sub-areas not containing any periodic structurings, as illustrated in FIG. 6b. The threshold is determined by the empirical value $I_{moy}/\sqrt{6}$ where $I_{moy}$ is the average value of the surface roughness. The drawings of the contours consist of closed non-intersecting lines in the plane which connect the points of equal heights. In this way, for each configuration of random surfaces given by the different turbid media, a configuration of a set of contours is assigned.

Figure 6C:
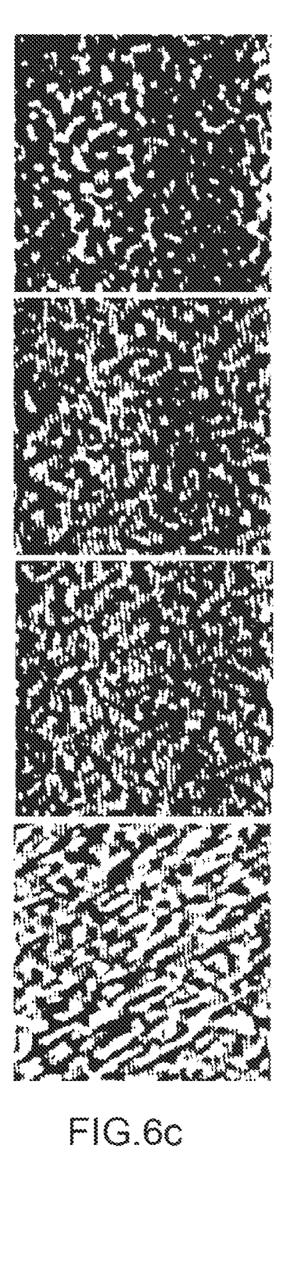

These contours are then filled, as illustrated in FIG. 6c.

2.2: Step of Computation on the Images:

From the image comprising areas defined by contours (as illustrated in FIG. 6c), containing more or less significant spots depending on the turbulence, these images are processed by multifractale analysis. The aim is to reveal the processes of self-similarities in the images processed to have the areas in which the surface grating obtained by molecular self-organization has disappeared.

2.2.1: First Step:

The image is divided into boxes of equal lengths s. In each of these boxes of length s, a line of least squares is used to adjust the box to the data (representing the trend in the box).

The coordinates x and y of the line segments are computed.

The trends of the fluctuations are eliminated from the image by subtracting the local trend.

The effective value of the fluctuations of the image are then computed. The computation is repeated for all the lengths of the boxes to characterize the local fluctuations as a function of the size of the boxes.

More specifically the first step consists in dividing the profiles on x and y of the image into $N_s=[N/s]$ separated segments respectively and computing the cumulative sum X(i) and Y(i) such that:

$$X(i)=\Sigma_{k=i}^{i}x_k-\langle x\rangle \text{ and } Y(i)=\Sigma_{k=i}^{i}y_k-\langle y\rangle$$

In each segment of size s, the series of the integrated signal are approximated ("fit") by using a polynomial function $p_v(i)$ for $\{x_i\}$ and $q_v(i)$ for $\{y_i\}$.

2.2.2: Second Step:

The fluctuation function is computed stripped of the trends by subtracting the local trend from each box and the fluctuation of the moment of the $q^{th}$ route is computed:

$$F_q(s) = \sqrt[q]{\frac{1}{N}\sum_{i=1}^{N_s}(|X_s(i)||Y_s(i)|)^q}$$

where:

$$\sum_{i=1}^{N_s}(|X_s(i)||Y_s(i)|)^q \approx s^{\tau(q)}$$

with $X_s(i)=X(i)-p_v(i)$, $Y_s(i)=Y(i)-q_v(i)$ and q being a non-zero integer.

2.2.3: Third Step:

A power law relationship between the function $F_q(s)$ and the size of the box s indicates the presence of scale. The generalized Hurst exponents $\tau(q)$ are obtained in this way. They are linked to the different levels of amplification of the small fluctuations in the data.

The dependency of $\tau(q)$ is a decreasing monotonic function of q for a stationary signal and simply reflects the fact that the weak fluctuations occur more often in the signal than the stronger ones, with $\tau(q)=qh(q)-1$.

Figure 7:
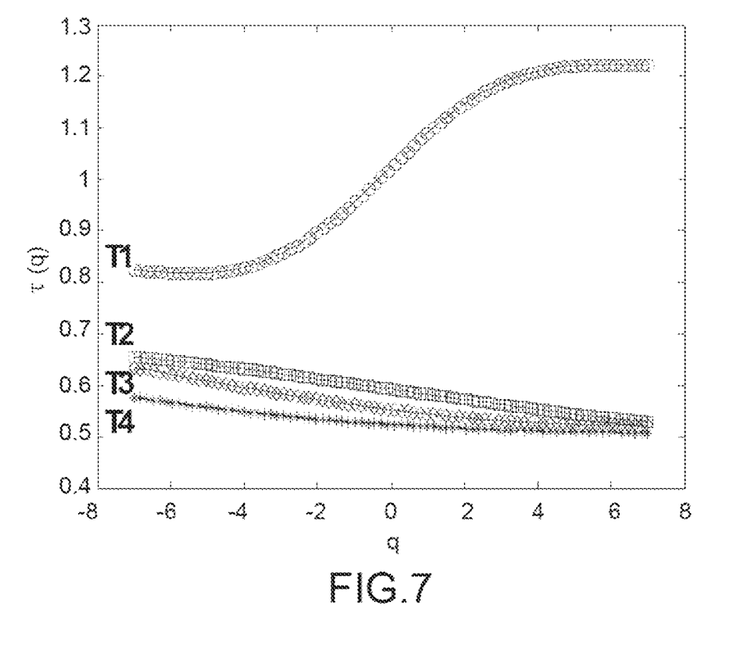
FIG. 7 illustrates the trend of the multifractality exponent as a function of the parameter q for different turbulence conditions.

FIG. 7 illustrates the trend of the coefficient $\tau(q)$ as a function of the number q for the different turbulences T1, T2, T3 and T4. The curves which are not linear reflect a multifractal behavior.

For the positive variations of q, h(q) describes the scale behavior of the boxes with large fluctuations.

For a strong turbulence, the present invention makes it possible to confirm a significant scale exponent for the large fluctuations. On the contrary, for the negative values of q, h(q) describes the scale behavior of the segments with small fluctuations.

It can be seen that the turbulence T1 induces little scale behavior for the weak fluctuations. The trend is reversed for the other turbulence conditions.

It will be noted that, by reducing the turbulence (turbulence T4), the signal becomes increasingly monofractal.

2.2.4. Fourth Step:

The function of the singularities obtained by a Legendre transform can be used:

$$\alpha(q)=d\tau(q)/dq$$

It is also possible to use a multifractality spectrum:

$$f(\alpha)=q(\alpha)\alpha-s(q(\alpha))$$

The latter approach gives a useful representation of the multifractality.

Figure 8:
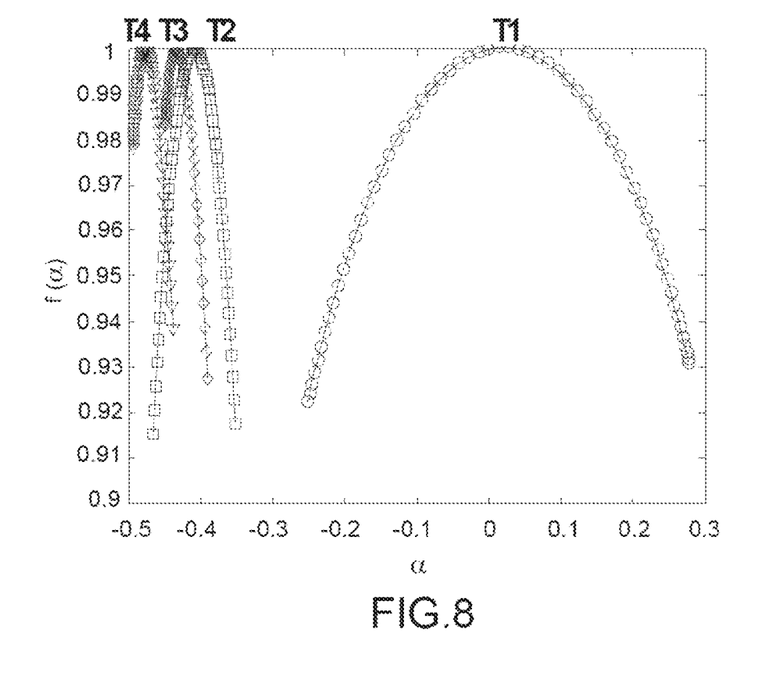
FIG. 8 illustrates the multifractality spectrum $f(\alpha)$ called spectrum of singularities for different turbulence conditions.

The width of the spectra $f(\alpha)$ measures the level of multifractality of the signal. The greater the width, the more multifractal the signal is. FIG. 8 illustrates these spectra for the different turbulences T1, T2, T3 and T4.

The maximum of the function $f(\alpha)$ as a function of $\alpha$ is plotted in FIG. 8. Two linear trend areas of the maximum as a function of the force of the turbulence can be noted.

The value of $C_n$ can be assessed as a function of the maximum of $f(\alpha)$.

The width of $f(\alpha)$ at $f=0.9$ characterizes the number of multifractale singularities, that is to say that the signal has multiple scale laws and is strongly disturbed. The widths are very different as a function of the turbulence and make it possible to see that, with a high turbulence, the signal contains more multifractal fluctuations.

Figure 9:
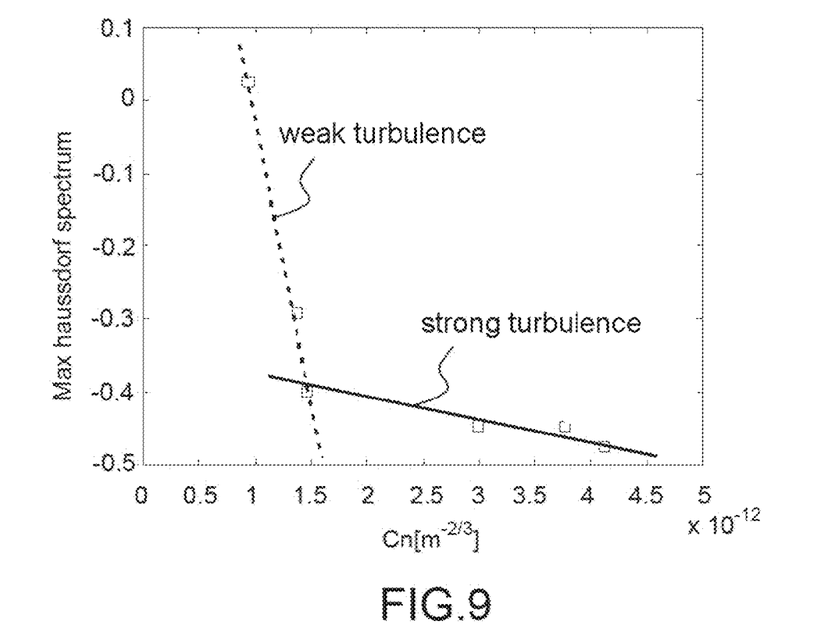
FIG. 9 illustrates the trend of the maximum positions $f(\alpha)_{max}$ as a function of refraction index Cn.

This last measurement characterizes the trend of the sub-structures on the surface of the azopolymer which become less regular with the increase in the turbulence. The value of $f(\alpha)$ is linked to $C_n$ by the relationship maxHdff=−0.8·$C_n$+0.8 for a weak turbulence and maxHdff=−0.23·$C_n$+0.26 for a strong turbulence, with $f(\alpha)_{max}$=maxHdff.

FIG. 9 thus illustrates the case of a weak turbulence and the case of a strong turbulence.

The method of the present invention also makes it possible to compute the lacunarity which assesses the uniformity of the distribution of the light intensities and therefore to know how the object fills the space.

The study of the lacunarity makes it possible to measure the distribution of holes in the image: if the latter comprises great contrasts (to scale), then the lacunarity of the image will be high. Conversely, if the image is uniform, then its lacunarity will be low.

The lacunarity is measured by using a sliding box algorithm.

The algorithm uses a box of size s×s with s being its width placed at the top left corner of the image. The number of pixels of the signal in the box is counted.

The box is slid by one pixel to the right and the number of pixels in the box is counted, and so on. The process is repeated until the box reaches the bottom right corner of the image.

If λ is the size of the image, the number of boxes of width s is $N(s)=(\lambda-s+1)^2$. The width s of the box is chosen such that the numerical value is equal to 2, 4, 8, . . . , 1.

For each box of width s, the following two quantities are measured: the sum of the number of pixels of the signal in each box $Q_1 = \Sigma_i p(i,s)$ and the quadratic sum $Q_1 = \Sigma_i p(i,s)^2$.

The lacunarity L(s) for a box size is defined by:

$N(s) \cdot Q_2/Q_1^2$ p(i, λ) is the number of pixels of the signal in the $i^{th}$ box and i lies between 1 and N(s).

Figure 10:
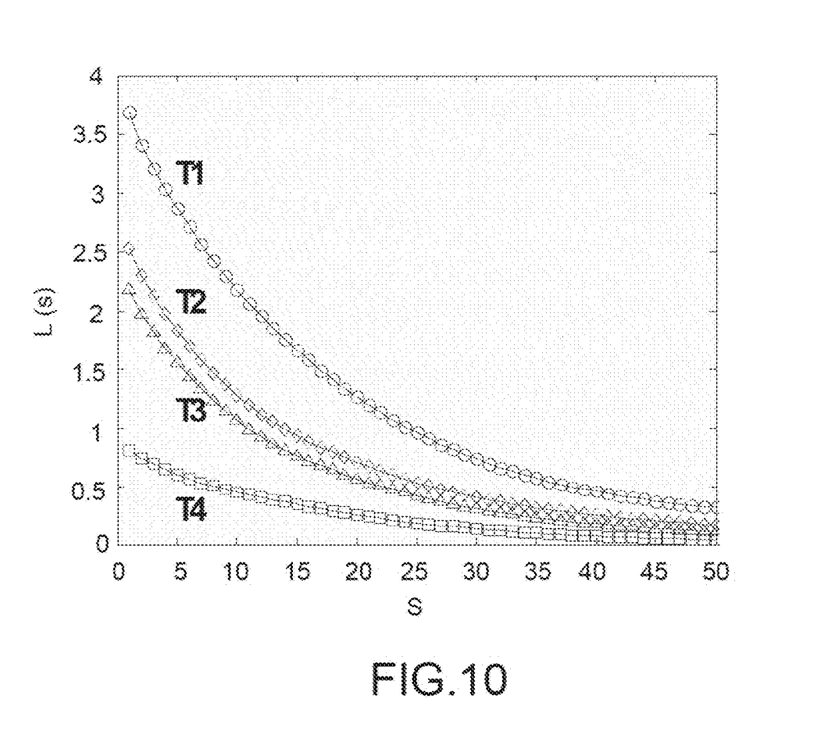
FIG. 10 illustrates the trend of the lacunarity function for different turbulence conditions.

The lacunarity function is assessed from the measurements of FIG. 10 approximated ("fitted") with a hyperbolic function.

$L(s)=b/s^a+c$, where b relates to the concavity of the hyperbola.

A low value of b gives a hyperbola with a wide concavity (strong concavity). A low value of b describes an object with a strong distribution of empty interstices.

FIG. 10 shows the computation of the lacunarities computed from contrasted images where the contours correspond to the threshold of the contar images (FIG. 6c). The computation shows the different texturings of the images for different turbulence conditions. The values obtained on the examples of structurings shown in FIG. 6a gives, for the value of the coefficient of the parabola b as a function of $C_n$:

| b | $C_n$ |
|---|---|
| 2.61 | $9.41 \cdot 10^{-13}$ |
| 8.62 | $1.47 \cdot 10^{-12}$ |
| 10.94 | $3.77 \cdot 10^{-12}$ |
| 19.11 | $4.12 \cdot 10^{-12}$ |

The curvature of the hyperbola becomes increasingly strong as the turbulence decreases implying a greater space between the dark areas of the images of FIG. 6c. With the turbulence, the beam fluctuates spatially and loses its coherence reducing the structured areas on the azopolymer film. These unstructured areas represent the integration in time of all the spatial fluctuations.

Figure 11:
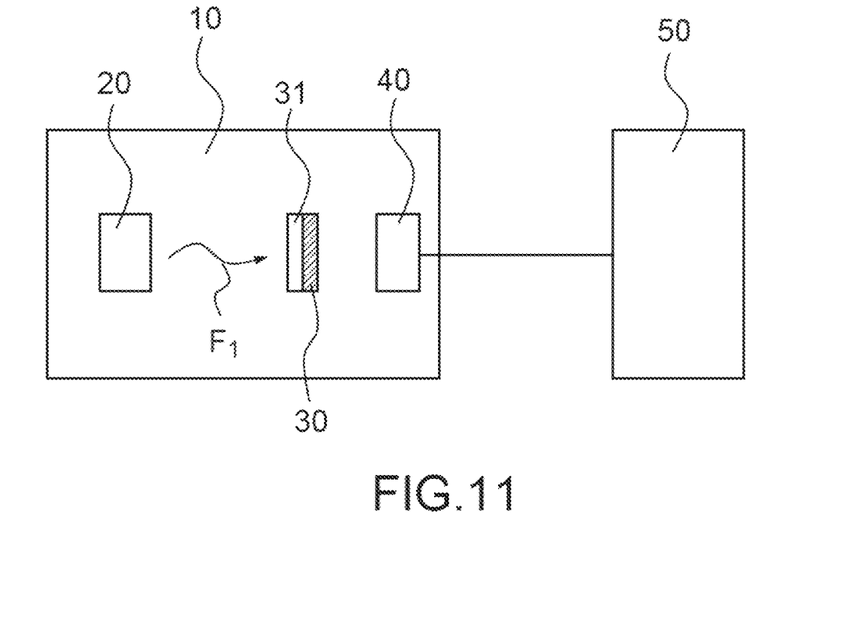
FIG. 11 illustrates a first exemplary device using the method of the invention.

According to a first exemplary device represented in FIG. 11, the method of the present invention can be implemented in a unit 10 comprising a laser source 20, a substrate 30 covered with a film of photochromic material 31 and a detector of CCD camera type 40. This unit is linked to a processing device 50.

Figure 12:
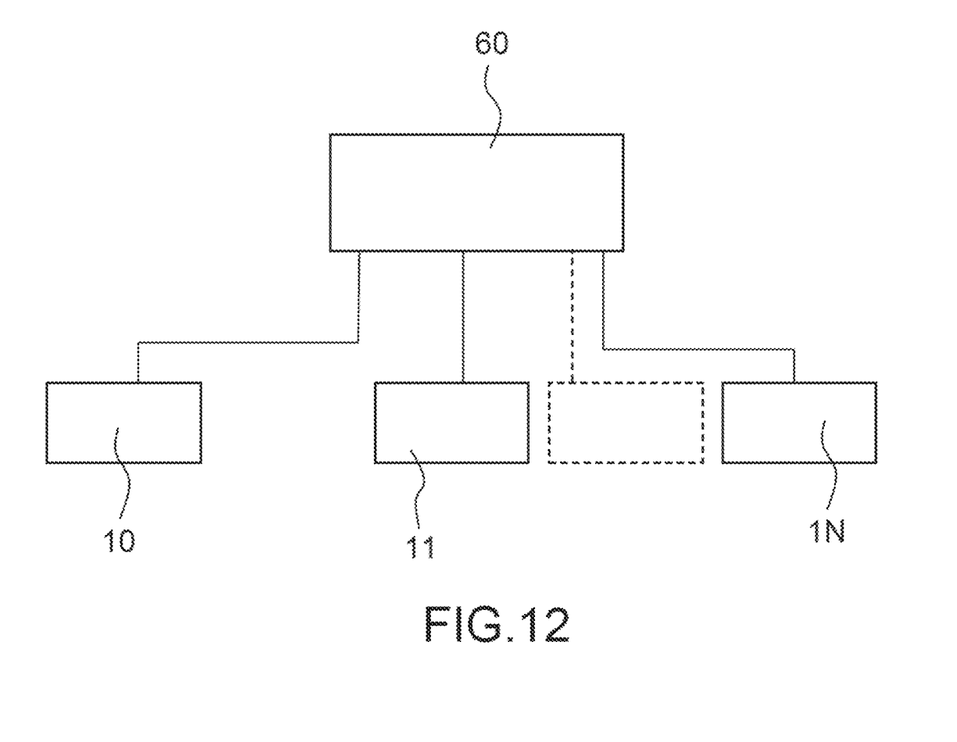
FIG. 12 illustrates a second exemplary device using the method of the invention.

According to a second example of the invention, the device can comprise a set of units 10, 11, . . . , 1N linked to a central processing device 60 and making it possible to collect different turbulence information at different points via the processing center 60.

The invention claimed is:

1. A method for assessing turbulence parameters of a medium, comprising:
   a step of illumination, by a laser beam being propagated in said medium, of a film of photochromic organic material including molecules of azobenzene, or of spyropyrane, or of stilbene, or of coumarin, or of fulgide, said step of illumination by the laser beam creating a surface grating on said film, said surface grating having scratches having a regular alignment, deformations in said regular alignment in said scratches being a function of the turbulence parameters;
   a step of acquisition of images having individual areas of structures linked to said scratches, more or less reduced and representative of the turbulence parameters of said medium; and
   a step of processing of said images to assess the turbulence parameters of said medium.

2. The method for assessing turbulence parameters as claimed in claim 1, further comprising:
   a step of acquisition of images of diffraction of the laser beam by the surface grating created by the laser beam, said images exhibiting diffraction spots, the characteristics of said diffraction spots are dependent on the turbulence parameters.

3. The method for assessing turbulence parameters as claimed in claim 2, wherein the step of processing of said images comprises:
   an operation of Radon transform of said images to generate images derived by an image computation in a revolving reference frame generating, from areas of said diffraction belonging to said images, a set of peaks belonging to the derived images,
   a comparison of said set of peaks with a set of reference peaks of turbulence conditions to estimate a level of turbulence of said medium.

4. The method for assessing turbulence parameters as claimed in claim 1, further comprising:
   a step of acquisition of images performed by atomic force microscopy AFM;
   a step of processing of said images to recognize, quantify and analyze the individual areas formed on the surface grating dependent on the turbulence parameters and to obtain derived images;
   a step of analysis of said derived images by fractal or multifractal analysis, over all of said individual areas to define scale invariance properties and determine a turbulence information of said medium.

5. The method for assessing turbulence parameters as claimed in claim 4, wherein the step of processing of said images comprises the following operations:

using a Gaussian filter, averaging each of acquisition points of said images with neighboring points for generating filtered images;

constructing a set of derived images by processing of said filtered images by a transformation of said filtered images into binary filtered images, followed by marking of areas of the film that are free of scratches to increase a contrast between said individual areas.

6. The method for assessing turbulence parameters as claimed in claim 5, wherein the step of fractal or multifractal analysis comprises the following steps:

dividing said image according to two dimensions x and y, into segments N/s, defining a partition in boxes, N being a dimension of the image and a computation of two cumulative sums X(i) and Y(i) defining a signal, such that:

$$X(i)=\Sigma_{k=1}^{i} x_k - <x> \text{ and } Y(i)=\Sigma_{k=1}^{i} y_k - <y>$$

with $<x>$ and $<y>$ corresponding to averages of the signal on said two dimensions x and y;

estimating in each of the boxes of a surface defined by two polynomial functions $(p_v(i), q_v(i))$ according to the two dimensions x and y, to approximate said signal and to define a trend in each of the boxes and variations relative to said trend to define the parameters $X_s(i)=X(i)-p_v(i)$ and $Y_s(i)=Y(i)-q_v(i)$;

computing a fluctuation function stripped of said trends defined by the equation:

$$F_q(s) = \sqrt[q]{\frac{1}{N}\sum_{i=1}^{N_s}(|X_s(i)||Y_s(i)|)^q}$$

with q being a non-zero integer and in which:

$$\sum_{i=1}^{N_s}(|X_s(i)||Y_s(i)|)^q \approx s^{\tau(q)}$$

and to define a power law between the function $F_q(s)$ and the size(s) of the boxes, and to define a multifractal scale exponent $\tau(q)$;

determining a singularity function $\alpha(q)=d\tau(q)/dq$ and a multifractal spectrum: $f(\alpha)=q(\alpha)\cdot\alpha-s[q(\alpha)]$ exhibiting a maximum value $f(\alpha)_{max}$;

comparing a value $f(\alpha)_{max}$ with a calibration table referring to the values $f(\alpha)_{max\,St}$ with refraction indices Cn and to link the refraction index Cn with a reference turbulence parameter.

7. A device for assessing turbulence parameters of a medium, comprising:

a measurement unit comprising:
a film of photochromic organic material including molecules of azobenzene, or of spyropyrane, or of stilbene, or of coumarin, or of fulgide;
a laser source emitting a laser beam being propagated in said medium and interacting with said film to create a surface grating on said film, said surface grating comprising scratches having a regular alignment, deformations in said regular alignment of said scratches being a function of the turbulence parameters;
a detector to acquire images comprising individual areas of structures linked to said scratches, more or less reduced and representative of the turbulence parameters of said medium and generating signals relative to said images;

a processing device for receiving and processing said signals after passage through said medium, said signals delivering assessment information on the turbulence parameters of said medium.

8. The device for assessing turbulence parameters of a medium as claimed in claim 7, further comprising:
a set of measurement units, said measurement units being linked with said processing device.

9. A use of the device for assessing turbulence parameters of an ambient medium as claimed in claim 7, for producing measurements of air movements in an environment including an urban environment.

* * * * *